No. 839,657.     PATENTED DEC. 25, 1906.
T. A. SHIPP, Jr.
LUBRICATING APPARATUS.
APPLICATION FILED APR. 2, 1906.
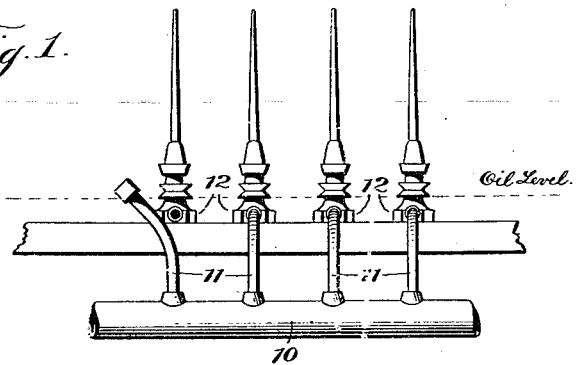
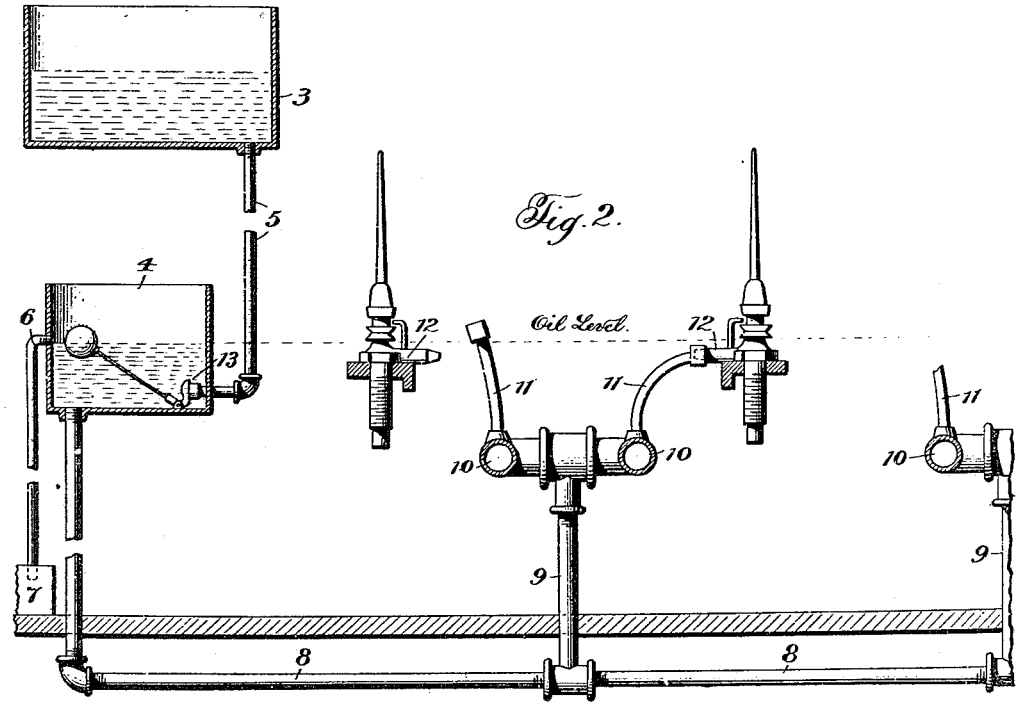

UNITED STATES PATENT OFFICE.

THOMAS A. SHIPP, JR., OF TIFTON, GEORGIA.

LUBRICATING APPARATUS.

No. 839,657.　　　Specification of Letters Patent.　　　Patented Dec. 25, 1906.

Application filed April 2, 1906. Serial No. 309,375.

*To all whom it may concern:*

Be it known that I, THOMAS A. SHIPP, Jr., a citizen of the United States, residing at Tifton, in the county of Tift and State of Georgia, have invented certain new and useful Improvements in Lubricating Apparatus, of which the following is a specification, reference being had therein to the accompanying drawings.

This invention relates to means for supplying lubricant to the several bearings in the same plane of one or more pieces of machinery from a common source of supply, supply and distributing pipes transferring the lubricant from the supply-tank to the various bearings. The invention associates with such a system means whereby the lubricant supplied to one or more sets or series of bearings is at all times maintained at a predetermined and uniform level or height. Further, the system is so arranged that the supply-pipe of each bearing may be disconnected without disturbing or cutting off the supply to the other bearings, and the various parts of the system are so disposed as to be readily accessible, yet out of the way during operation of the machines to which they are connected.

The details of construction and arrangement of parts contemplated by this invention are disclosed in the accompanying drawings, forming part hereof, wherein is shown for purposes of illustration an adaptation of the invention as applied to a spinning-machine, to which character of machinery the invention is especially applicable, as the labor incident to the manual lubrication of its multiplicity of spindles is very great.

In the drawings like reference characters refer to corresponding parts in the several views, of which—

Figure 1 is a view of part of a spinning-machine, showing the arrangement of the distributing-pipes; and Fig. 2 is a view showing the disposition of the several parts of the system with respect to the spindles of a plurality of spinning-machines.

Having more particular reference to the drawings, 3 designates an oil-supply tank which may be located in any convenient place with respect to the machinery to be supplied with oil, such as in a detached oil-house or in the same building or room with the machinery. A float-tank 4 is provided for each series of bearings on the same horizontal plane, such as the spindles in the spinning-machines shown in the drawings, where one float-tank is provided for a plurality of similar spinning-machines whose spindles are at a uniform height, the tank being located in the plane of the spindles. Connecting each float-tank with the supply-tank is a pipe 5, and each float-tank is provided with an overflow-pipe 6, arranged to draw off excess oil above a predetermined line and leading into an overflow-tank 7.

A trunk-pipe 8 leads from the float-tank 4 to supply oil to the bearings, whose lubrication is controlled from that tank. Pipe 8 may be located at any convenient place, as under the floor where it is out of the way, as shown in the drawings, and it leads under the one or more machines to which it supplies oil. For each machine a pipe 9 is coupled to the trunk-pipe and to pipes 10, leading along and in rear of the line of spindles, where they are out of the way. For each spindle a pipe 11 is tapped into a pipe 10 and is coupled to the base 12 of the spindle. Pipe 11 is preferably made of lead or other suitable pliable material and of sufficient length so that when it is disconnected from the spindle-base for purpose of repair or otherwise its free end may be turned up above the oil-line, and thus obviate the emission and loss of oil therefrom. It will be seen that by this manner of connecting the pipes it will not be necessary to withdraw the oil from any of the pipes when it is desired for any reason to disconnect the feed-pipes of one or more spindles.

The operation of the system is automatic. Oil enters the float-tank from the supply-tank until it has reached the level required for the lubrication of its series of bearings, when the flow of oil into that tank will be automatically stopped by the float-controlled valve 13, which is adjusted to close the inlet when this level is reached. From the float-tank the oil passes through pipes 8, 9, 10, and 11 to the bearings and is maintained in the bearings at a proper level by automatic operation of the float-valve in an obvious manner.

Having thus described my invention, what I claim as new, and desire to secure by Letters Patent, is—

1. The combination with a series of bearings in the same plane, of a lubricant-supply system comprising a tank connected with a supply-pipe from the source of supply and connected with a pipe communicating with said bearings, and means in said tank whereby lubricant is maintained at a predetermined height in said bearings.

2. The combination with a series of bearings in the same plane, of a lubricant-supply system comprising a tank connected with a supply-pipe from the source of supply and connected with a pipe communicating with said bearings, and an automatically-operative valve in said tank whereby lubricant is maintained at a predetermined height in said bearings.

3. The combination with a series of bearings in the same plane, of a lubricant-supply system comprising means whereby the lubricant is maintained in the bearings at a uniform level, and a pliable pipe connecting each of the bearings with the source of supply, said pipe being so arranged that when disconnected from its bearing and turned upwardly its free end will be above the level of the lubricant.

In testimony whereof I affix my signature in presence of two witnesses.

T. A. SHIPP, JR.

Witnesses:
W. C. SAULS,
W. PINKSTON.